Nov. 25, 1969  M. G. ALLEN ET AL  3,479,877
TIME-TEMPERATURE INDICATOR
Filed Aug. 28, 1968
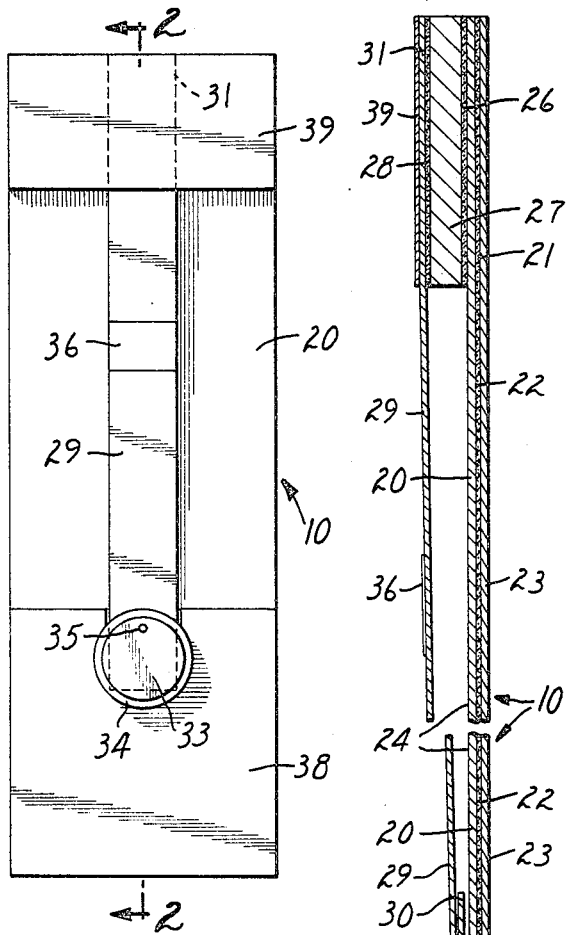
FIG. 1
FIG. 2
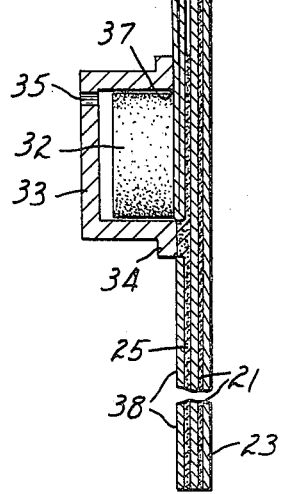
INVENTORS
MICHAEL G. ALLEN
LOUIS A. ERREDE
RODNEY R. HANNULA
BY Kinney, Alexander,
Sell, Steldt & DeLaHunt
ATTORNEYS

United States Patent Office 3,479,877
Patented Nov. 25, 1969

3,479,877
TIME-TEMPERATURE INDICATOR
Michael G. Allen, Hudson, Wis., Louis A. Errede, Roydon Borough, England, and Rodney R. Hannula, Maplewood, Minn., assignors to Minnesota Mining and Manufacturing Company, St. Paul, Minn., a corporation of Delaware
Filed Aug. 28, 1968, Ser. No. 755,844
Int. Cl. G01k 11/06
U.S. Cl. 73—358         8 Claims

ABSTRACT OF THE DISCLOSURE

An indicator device for showing the length of time an environment has been at or above a predetermined temperature. A fusible tablet of temperature indicator substance enclosed by a protective rigid cap is positioned at one end of a wick which is attached to but spaced from a heat-conducting base sheet. When the predetermined temperature is reached, the indicator substance melts and flows along the wick, the distance of flow indicating the length of exposure time.

Background of the Invention

The invention relates to a device for visually indicating the time an object has been exposed at or above a predetermined temperature.

There has long been a need for a simple, inexpensive, compact, reliable device to indicate whether an object has been exposed to a particular temperature. There has also been a need for a similar device to record how long an object has been exposed to a particular temperature. Ideally, a device would fulfill both of these needs by indicating if an object has reached a particular temperature and also recording the exposure time at that temperature.

A typical application for such a device exists in the aircraft industry, particularly for determining whether laminated honey-comb wing assemblies have been heated enough to cure the laminating adhesive. The heating process is usually carried out in a sealed autoclave, making it difficult to ascertain whether the part to be bonded has reached the requisite temperature for a sufficient period of time.

Although time-temperature indicators are known, none has heretofore combined the features of simplicity, compactness, reliability, and economy. For example, U.S. Patent 3,242,733 discloses a device having a fluid-tight reservoir containing fusible material which melts and flows through a tube packed with a wick material. The distance of flow is compared to an adjacent pre-calibrated scale to determine the time-temperature experience of the device. Such a device is obviously large, expensive, difficult to make, and hard to attach to an object whose time-temperature history is to be recorded. The tube diameter must be quite uniform, the density of the wick packing carefully controlled, and the calibrated scale carefully located with respect to the reservoir and tube, to assure reliability and reproducibility.

U.S. Patent 3,324,723, discloses a simpler and less expensive indicator, in which a calibrated wick is laminated to aluminum foil, one end of the wick having a tablet, preferably a drop, of indicating substance thereon. This device may be enclosed in an envelope having compartments to restrict the flow of the indicating substance. However, the indicating substance is not protected from injury, hence subject to damage. Since the drop of indicating substance which, in effect, constitutes a reservoir from which the wick draws, is produced by dip coating, its size cannot be consistently reproduced; hence, characteristics of the device cannot be accurately predicted. When a tablet of indicator substance is used, it does not maintain intimate contact with the wick; further, the indicator substance does not migrate or flow at a predictable rate along the adhesive which laminates the wick to the aluminum backing. When the device is enclosed in a compartmented envelope, different pressures are built up in each compartment, resulting in uneven, inconsistent flow of indicator substance.

Summary

The present invention provides a device for accurately and predictably indicating if an object has been exposed to a predetermined temperature and for visually recording the exposure time at or above that temperature. More particularly, the invention provides a device that is simple, reliable, compact, inexpensive, and able to withstand rough handling. The device achieves reliability and reproducibility by equalization of pressure differentials in various compartments, by utilizing reproducible quantities of temperature indicating substance, by utilizing a constant size reservoir of indicator substance, by uniformity of the wick material, and by utilizing a wick that is not laminated to another surface.

In accordance with the invention, at least one end of a fibrous absorbent wick, which is wettable by a molten temperature indicator substance, is attached to one side of a base sheet. The portion of the wick between attachment points is preferably spaced from the base sheet, thereby insuring that the indicator substance flows only along the wick. A fusible tablet of temperature indicator substance is positioned on the wick at the end thereof attached to the base sheet, the tablet melting whenever the predetermined temperature is reached. A rigid cap overlies and surrounds the sides of the tablet to protect it from damage and hold it in place on the wick without the presence of adhesive between the wick and tablet.

In use, the device is enclosed in an environment with (preferably attached by adhesive to) an object which is to be exposed at or above a predetermined temperature. The tablet melts when the predetermined temperature is reached and flows along the wick at a predictable rate, the distance of flow indicating the length of exposure time.

Brief Description of the Drawing

Understanding of the invention will be facilitated by referring to the accompanying drawing, in which like numbers refer to like parts in the several views and in which:

FIGURE 1 is a top view of a time-temperature indicator device embodying the principles of the invention; and FIGURE 2 is an enlarged longitudinal, broken, cross-sectional view of the device of FIGURE 1, taken along section line 2—2 and having its thickness exaggerated for clarity.

The overall construction is best shown in FIGURE 1, while structural details are illustrated primarily in FIGURE 2.

Description of the Presently Preferred Embodiment

The embodiment shown in the drawing and herein described is preferred for recording the time-temperature history of laminated metal parts which are autoclaved to cure the laminating adhesive.

Device 10 comprises heat-conductive base sheet 20, which extends the length and breadth of device 10 and is advantageously a 1″ x 3″ x 0.005″ sheet of tempered aluminum but can be any suitable size and of any suitable material such as tin, lead, etc., or even temperature resistant plastics. Base sheet 20 serves as an efficient means of transferring heat to device 10, from objects whose time-temperature history is to be recorded. A layer of normally tacky and pressure-sensitive adhesive 21 is securely bonded to lower surface 22 of foil 20 to facilitate easy and convenient attachment of device 10 to said parts. While pressure-sensitive adhesives are preferred, it is also possible to utilize solvent cements or other adhesives which are capable of withstanding the temperatures to which they will be exposed, for the maximum length of time that exposure may occur without flowing, creeping, or delaminating. Examples of preferred adhesives are the acrylates such as those described in U.S. Patent Re. 24,906 with a 90/10 ratio of isooctyl acrylate-acrylic acid polymerized as described in Example 12 being especially preferred. Other useful adhesives are silicone adhesives such as those described in U.S. Patent 2,882,183.

Protective liner 23 is releasably secured to adhesive 21 so as to prevent device 10 from inadvertently adhering to a foreign object during shipment and storage prior to actual use. Liner 23 is readily manually peelable from adhesive 21 so as to expose adhesive 21 for attachment to parts to be autoclaved. While 80 lb. supercalendered paper coated on both sides with Dow Corning No. 23 silicone resin is preferred, any of the numerous release liners commonly known to the art can be utilized.

The upper surface 24 of foil 20 has foam layer 25 securely adhered thereto. Foam layer 25 is advantageously one square inch of temperature resistant urethane foam coated on both sides with the isooctyl acrylate-acrylic acid adhesive previously discussed, although other adhesives and ordinary double-backed masking tape or even a rubber cement can also be utilized. The adhesive must withstand the temperatures to which it will be exposed, without creeping, flowing, or delaminating. Adhesives similar to those used for adhesive 21 are suitable. The distal end of foil 20 has adhesive 26 securely affixed to a ½" x 1" area on the upper surface 24 thereof, although, the specific area covered is not critical. Adhesive 26 is preferably, although not necessarily, the same as adhesive 25. Spacer 27, which is adhered in place on adhesive 26, is preferably of ⅛" thick cardboard, but can be of any light-weight, inexpensive, void-filling material. Adhesive 28 is located on the upper surface of spacer 27 and is similar to adhesive layer 26. Adhesives 26 and 28 must be capable of withstanding the same temperature conditions as adhesive 21 and 25.

Wick 29 comprises a strip of paper folded to a double thickness at one end, with folded portion 30 being adhered to foil 20 by means of adhesive coated foam layer 25. The distal end 31 of wick 29 is adhered to spacer 27 by means of adhesive 28. The suspended arrangement of wick 29 keeps it positioned above base 20 in a spaced relationship. Wick 29 is made of a cellulosic fibous material which is wettable by the temperature indicator substance utilized. A preferred wick 29 is 2¾" x ¼" with a ½" fold 30 and is a high quality filter or chromatographic paper such as Chemical Rubber Company No. 596 or Whatman 3MM, but can be any uniform wicking material such as string, thread, etc. Of course, the more uniform wick materials are most losic fibrous material which is wettable by the temperature indicator devices.

Tablet 32 of temperature indicator substance is positioned on wick 29 at the folded end thereof. When the temperature of the environment in which device 10 is located reaches the melting point of the indicator substance, it liquefies, is absorbed by wick 29 and 30 and begins to flow along wick 29. The distance the indicator substance progresses along wick 29 is directly related to the time that the substance is liquid and is a measure of the length of time the temperature is at or above the melting point of said substance. If at any time the temperature should fall below the melting point of the indicator substance, it solidifies and stops flowing, but if its melting point is again reached, it again begins to flow so that the distance traveled is the cumulative total of all time periods at or above the melting point. The indicator substance can be a colored compound for easy observation of the distance of wicking, but if not inherently colored, can contain a dye such as 1,4,5,8-tetraaminoanthraquinone (Celliton-G), General Aniline & Film Corp.). Approximately 0.01% of dye in a colorless temperature indicator substance is a preferred amount to provide an adequate amount of coloring for easy visibility, although the specific percentage will vary slightly with a different dye. In order to insure that the indicator will not wick more rapidly at temperatures considerably above its melting point and give false measurements of time, the indicator substance used should have a sharp melting point, and should melt rather than decompose or sublime. Further, the indicator substance should maintain a relatively constant distance of travel in a wick despite fluctuations in temperature above its melting point. Thus, tablet 32 preferably weighs about 0.07 gram and is about ¼ inch in diameter, but need only be of a size sufficient to supply enough molten temperature indicator substance to saturate wick reservoir 30 and the length of wick 29 that the indicator substance will flow in the maximum exposure time contemplated.

Time-temperature measurements can be made at almost any predetermined temperature and are limited only by the availability of indicator materials which meet the above requirements and melt at the desired temperature. Numerous indicator substances which meet these criteria are available and are readily found in any handbook of organic compounds. Examples of acceptable temperature indicator substances and their melting points are: 1-tetradecanol 37° C.; acetoacetanilide, 84° C.; o-acetotoluidide, 120° C.; 2-ethoxy-3'-chloro-N,N'-diphenylurea, 122° C.

Rigid protective cap 33, having flange 34 at its lower edge and vent hole 35 in the top, overlies and encloses the top and sides of tablet 32, flange 34 being adhered to adhesive 25. Cap 33 protects tablet 32 from damage or breakage during shipment, storage, or use, and while preferably about 1/16 inch larger than tablet 32, is of any size and configuration slightly larger than that of tablet 32. Further, this arrangement serves to hold tablet 32 in position on wick 29 without the presence or interference of any adhesive or foreign substance to interrupt the uniform flow of temperature indicator substance into and along wick 29. Vent hole 35 which is preferably a small #80 drill hole, although the size can vary, prevents buildup of pressure which might force the indicating substance to wick at a rapid, uneven, or unpredictable rate.

Folded end 30 of the wick 29 is preferably about ½ inch long and serves as a reservoir for melted temperature indicator substance, assuring a constant, readily available supply of liquid indicator for wick 29. The spacing of wick 29 from base 20 assures that the temperature indicator substance will progress only along wick 29 and not along an interface with base 20 or a laminating adhesive. This spacing also prevents indicator substance from collecting or forming puddles along the length of wick 29 and prevents undesirable nonreproducible results. The combination of all these features permits superb accuracy, reliability, and reproducibility in a simple, compact, inexpensive, and disposable time-temperature device.

While an external calibrated standard can be utilized, wick 29 is preferably calibrated by means of mark 36 which is placed at the point on wick 29 that will be reached by indicator substance in the length of time to be measured. The exact location of mark 36 is dependent upon the wick material, the indicator substance, and the length of time to be measured. If desired, several calibration marks can be placed along the length of wick 29 to measure various lengths of time. As an example of a typical calibration, in one hour, 2-ethoxy-3'-chloro-N,N'-diphenylurea and 0.01% 1,4,5,8-tetraminoanthraquinone as the indicator material progresses a distance of about ¾ inch from the leading interior edge 37 of cap 33 along ¼ inch wide Chemical Rubber Company No. 596 filter paper at temperatures above 122° C.

Paper covers 38 and 39 respectively overlie and are adhered to adhesive layers 25 and 28 and provide convenient locations for printing labels and directions for use of the time-temperature indicator device, as well as covering excessive adhesive that might otherwise be undesirably exposed.

We claim:
1. A device for visually indicating the length of time at or above a predetermined temperature, said device comprising:
   a heat-conducting base sheet,
   a fibrous absorbent wick having at least one end thereof attached to said base sheet, said wick being elevated above and in spaced relationship to said base sheet,
   a fusible tablet of temperature indicator substance positioned on said wick at the end thereof which is attached to said base sheet, said tablet melting at said predetermined temperature, and
   a rigid cap attached to said base sheet and overlying and enclosing the sides and top of said tablet so as to secure it in place on said wick without the presence of an adhesive between said wick and said tablet,
whereby when said device is exposed to a temperature at or above said predetermined temperature, said tablet melts and flows along said wick at a predictable rate to indicate the length of exposure time.

2. The device of claim 1, wherein the wick has at least one calibration mark thereon.

3. A device for visually indicating the length of time at or above a predetermined temperature, said device comprising:
   a self-supporting heat-conducting metal foil base sheet,
   a fibrous absorbent wick having a double thickness fold at one end thereof, at least one calibration mark thereon, both ends securely attached to said base sheet on one side thereof, and being wettable by molten temperature indicator substance, the portion of wick between attachment points being elevated above and in spaced relationship to said base sheet,
   a fusible tablet of temperature indicator substance positioned on said wick at the doubled end thereof, said tablet melting at said predetermined temperature,
   a vented rigid cap attached to said base sheet and overlying and enclosing the sides and top of said tablet so as to secure it in place on said wick without the presence of adhesive between said wick and said tablet, and
   a pressure-sensitive adhesive adhered to said base sheet on its major surface thereof opposite the side to which said wick is attached,
whereby when said device is exposed to a temperature at or above said predetermined temperature, said tablet melts and flows along said wick at a predictable rate to indicate the length of exposure time.

4. The device of claim 3, wherein said base sheet is aluminum.

5. The device of claim 3, wherein said rigid cap contains an opening in one wall thereof.

6. The device of claim 3, wherein said protective cap is aluminum.

7. The device of claim 3, wherein said tablet comprises 2-ethoxy-3'-chloro-N,N'-diphenylurea and 1,4,5,8-tetraaminoanthraquinone.

8. A device for visually indicating the length of time at or above a predetermined temperature, said device comprising:
   a rectangular aluminum foil base sheet,
   a calibrated absorbent paper wick folded to a double thickness at one end thereof, said wick being wettable by molten temperature indicator substance and having both ends adhesively secured to one side of said base, and the portion of said wick between attachment points being elevated above and in spaced relationship to said base sheet,
   a fusible tablet comprising 2-ethoxy-3'-chloro-N,N'-diphenylurea and 1,4,5,8-tetraminoanthraquinone positioned on said wick at the doubled end thereof,
   an aluminum cap adhered to said base sheet and overlying and enclosing the sides and top of said tablet to secure it in place on said wick without the pressure of adhesive between said wick and said tablet, said cap having an opening in one wall thereof to prevent buildup of pressure,
   a pressure-sensitive adhesive adhered to said base sheet, on its major surface thereof opposite the side to which said wick is attached, to attach said device to an object which is exposed to a temperature at or above said predetermined temperature, and
   a release liner releasably attached to said pressure-sensitive adhesive to prevent undesired adhesion to objects during transit or storage.

References Cited
UNITED STATES PATENTS

| | | | |
|---|---|---|---|
| 3,242,733 | 3/1966 | Johnson | 73—358 XR |
| 3,324,723 | 6/1967 | Ritchie et al. | 73—358 |

LOUIS R. PRINCE, Primary Examiner

F. SHOON, Assistant Examiner

UNITED STATES PATENT OFFICE
CERTIFICATE OF CORRECTION

Patent No. 3,479,877　　　　　　　Dated November 25, 1969

Inventor(s) Michael G. Allen, Louis A. Errede, Rodney R. Hannula

It is certified that error appears in the above-identified patent and that said Letters Patent are hereby corrected as shown below:

Column 3, lines 60 and 61, "losic fibrous material which is wettable by the temperature indicator devices" should read --desirable for making reliable, reproducible time-temperature indicator devices--. Column 4, line 4, "Celliton-G)" should read --(Celliton-G--.

SIGNED AND
SEALED
MAY 5 1970

(SEAL)
Attest:

Edward M. Fletcher, Jr.
Attesting Officer

WILLIAM E. SCHUYLER, JR.
Commissioner of Patents